United States Patent
Tanaka et al.

(10) Patent No.: US 8,676,454 B2
(45) Date of Patent: Mar. 18, 2014

(54) CONTINUOUSLY VARIABLE TRANSMISSION AND SHIFT CONTROL METHOD

(75) Inventors: Hiroyasu Tanaka, Atsugi (JP); Masahide Ito, Atsugi (JP); Masato Mori, Isehara (JP); Takashi Eguchi, Machida (JP); Ryousuke Nonomura, Kawasaki (JP); Seiichiro Takahashi, Isehara (JP); Mamiko Inoue, Ebina (JP)

(73) Assignee: JATCO Ltd, Fuji-shi (JP)

( * ) Notice: Subject to any disclaimer, the term of this patent is extended or adjusted under 35 U.S.C. 154(b) by 261 days.

(21) Appl. No.: 13/216,999

(22) Filed: Aug. 24, 2011

(65) Prior Publication Data

US 2012/0059559 A1 Mar. 8, 2012

(30) Foreign Application Priority Data

Sep. 8, 2010 (JP) ................................ 2010-200986

(51) Int. Cl.
*F16H 15/04* (2006.01)
(52) U.S. Cl.
USPC ............................................ 701/52; 192/48.8
(58) Field of Classification Search
USPC ................... 701/51–54; 192/48.2, 48.8, 84.6; 477/15, 18, 34, 39, 107, 110, 115, 45, 477/46, 50, 37, 38, 44
See application file for complete search history.

(56) References Cited

U.S. PATENT DOCUMENTS

| | | | |
|---|---|---|---|
| 7,493,203 B2 | 2/2009 | Bitzer et al. | |
| 2005/0227809 A1 | 10/2005 | Bitzer et al. | |
| 2008/0254935 A1* | 10/2008 | Kasuga et al. | 477/3 |
| 2009/0253549 A1* | 10/2009 | Koyama et al. | 475/284 |

FOREIGN PATENT DOCUMENTS

| | | |
|---|---|---|
| EP | 2 169 278 A1 | 3/2010 |
| EP | 2 169 279 A1 | 3/2010 |
| JP | 05-079554 A | 3/1993 |
| JP | 2002-243031 A | 8/2002 |
| WO | WO 03/067127 A2 | 8/2003 |

* cited by examiner

*Primary Examiner* — Dalena Tran
(74) *Attorney, Agent, or Firm* — Foley & Lardner LLP

(57) ABSTRACT

The shift control unit executes a control to cause the through speed ratio to follow the final through speed ratio by changing only the speed ratio of the variator if a shift instruction is given from the driver a plurality of times in a row when the manual mode is selected, and advances the start of a change in the speed ratio of the sub-transmission mechanism or accelerates the progression of the change of the speed ratio as compared with the case where the manual mode is not selected when the speed ratio of the variator is maximized or minimized and the through speed ratio cannot follow the final through speed ratio.

9 Claims, 9 Drawing Sheets

CONTINUOUSLY VARIABLE TRANSMISSION AND SHIFT CONTROL METHOD

FIELD OF THE INVENTION

The present invention relates to a shift control in a manual mode in a continuously variable transmission including a variator and a sub-transmission mechanism.

BACKGROUND OF THE INVENTION

A continuously variable transmission is known which includes a continuously variable transmission mechanism (variator) and a sub-transmission mechanism which is selectively switched to a plurality of forward gear positions. In such a transmission, a ratio range can be enlarged by the sub-transmission mechanism as compared with a continuously variable transmission formed only by a variator. Thus, fuel economy can be improved by improving engine efficiency.

In the case of a shift accompanied by a shift of the sub-transmission mechanism in such a transmission, the variator is shifted in a direction opposite to a shifting direction of the sub-transmission mechanism when the shift of the sub-transmission mechanism is started. In this way, a change in the rotation speed of an engine is suppressed without changing a speed ratio of the entire transmission before and after the shift, wherefore a shift shock can be suppressed (JP5-79554A).

Further, a continuously variable transmission is known which has a so-called manual mode in which a speed ratio is selectively controlled through a shifting operation by a driver (JP2002-243031A).

SUMMARY OF THE INVENTION

In the case of realizing a manual mode in a conventional continuously variable transmission, shift responsiveness is required to be quicker than that during a period from the start to the end of a shift in a normal drive range in order to quickly achieve a driver's intention to shift.

On the other hand, in a shift accompanied by a shift of a sub-transmission mechanism, preparation of a hydraulic control is necessary to shift the sub-transmission mechanism, and shift responsiveness until the sub-transmission mechanism is shifted after a shift instruction is given differs from that of a variator. Thus, shift responsiveness differs between the shift only by the variator and that by the variator and the sub-transmission mechanism, whereby a sense of incongruity is given to a driver.

The present invention aims to prevent a shift in a manual mode from giving a sense of incongruity to a driver in a continuously variable transmission including a variator and a sub-transmission mechanism.

According to an aspect of the present invention, a continuously variable transmission installed in a vehicle to shift a rotation speed of an engine, includes a variator which changes a speed ratio continuously, a stepped sub-transmission mechanism provided in series with the variator and capable of switching a speed ratio depending on engagement and release of a plurality of friction elements, and a shift control unit which sets a final through speed ratio as a target speed ratio based on a driving condition of the vehicle and causes a through speed ratio, which is an overall speed ratio of the variator and the sub-transmission mechanism, to follow the final through speed ratio in a specified response by changing at least one of the speed ratio of the variator or a gear position of the sub-transmission mechanism. The shift control unit has a manual mode in which a plurality of gear positions are set beforehand and a speed ratio corresponding to any one of the plurality of gear positions is set as the final through speed ratio based on a shift instruction from a driver, executes a control to cause the through speed ratio to follow the final through speed ratio by changing only the speed ratio of the variator if a shift instruction is given from the driver a plurality of times in a row when the manual mode is selected, and advances the start of a change in the speed ratio of the sub-transmission mechanism or accelerates the progression of the change of the speed ratio as compared with the case where the manual mode is not selected when the speed ratio of the variator is maximized or minimized and the through speed ratio cannot follow the final through speed ratio.

According to another aspect of the present invention a shift control method for a continuously variable transmission which includes a variator which changes a speed ratio continuously and a stepped sub-transmission mechanism provided in series with the variator and capable of switching a speed ratio depending on engagement and release of a plurality of friction elements, and is installed in a vehicle to shift and output the output rotation of a driving source, is provided. The shift control method includes setting a final through speed ratio as a target speed ratio based on a driving condition of the vehicle, causing a through speed ratio, which is an overall speed ratio of the variator and the sub-transmission mechanism, to follow the final through speed ratio in a specified response by changing at least one of the speed ratio of the variator or a gear position of the sub-transmission mechanism, causing the through speed ratio to follow the final through speed ratio by changing only the speed ratio of the variator if a shift instruction is given from the driver a plurality of times in a row when a manual mode is set in which a plurality of gear positions are set beforehand and a speed ratio corresponding to any one of the plurality of gear positions is set as the final through speed ratio based on a shift instruction from the driver, and advancing the start of a change in the speed ratio of the sub-transmission mechanism or accelerating the progression of the change of the speed ratio as compared with the case where the manual mode is not selected when the speed ratio of the variator is maximized or minimized and the through speed ratio cannot follow the final through speed ratio.

Embodiments and advantages of this invention will be described in detail below with reference to the attached figures.

DESCRIPTION OF THE PREFERRED EMBODIMENTS

Hereinafter, an embodiment of the present invention is described with reference to the accompanying drawings. In the following description, a "speed ratio" of a certain transmission is a value obtained by dividing an input rotation speed of this transmission by an output rotation speed thereof. A "lowest speed ratio" means a maximum speed ratio of this transmission and a "highest speed ratio" means a minimum speed ratio thereof.

Figure 1:
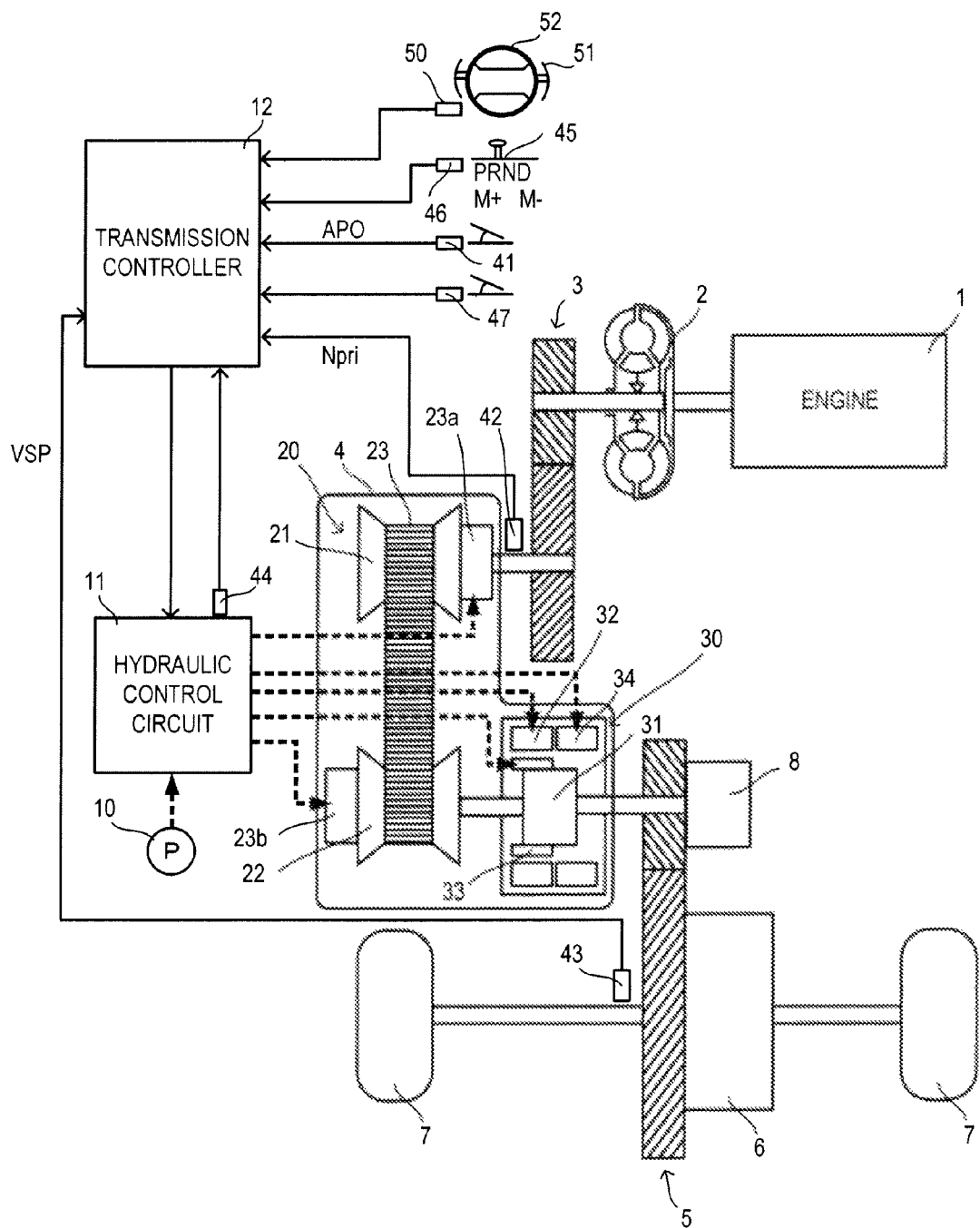
FIG. 1 is a schematic construction diagram of a vehicle including a continuously variable transmission according to an embodiment.

FIG. 1 is a schematic construction diagram of a vehicle including a continuously variable transmission according to this embodiment. The vehicle includes an engine 1 as a driving source. Output rotation of the engine 1 is transmitted to drive wheels 7 via a torque converter 2 with a lock-up clutch, a first gear train 3, a continuously variable transmission (hereinafter, merely referred to as a "transmission 4"), a second gear train 5 and a final speed reducer 6. The second gear train 5 includes a parking mechanism 8 for mechanically locking an output shaft of the transmission 4 in a parked state so as not to be able to rotate.

The vehicle is provided with an oil pump 10 which is driven using a part of power of the engine 1, a hydraulic control circuit 11 for adjusting a hydraulic pressure from the oil pump 10 and supplying the adjusted hydraulic pressure to respective components of the transmission 4 and a transmission controller 12 for controlling the hydraulic control circuit 11.

The respective constructions are described. The transmission 4 includes a continuously variable transmission mechanism (hereinafter, referred to as a "variator 20") and a sub-transmission mechanism 30 provided in series with the variator 20. "To be provided in series" means that the variator 20 and the sub-transmission mechanism 30 are provided in series in a power transmission path. The sub-transmission mechanism 30 may be directly connected to an output shaft of the variator 20 as in this example or may be connected via another transmission or power transmission mechanism (e.g. gear train).

The variator 20 is a V-belt continuously variable transmission mechanism including a primary pulley 21, a secondary pulley 22 and a V-belt 23 wrapped around the pulleys 21 and 22. Each of the pulleys 21, 22 includes a fixed conical plate, a movable conical plate arranged with a sheave surface faced toward the fixed conical plate and forming a V-groove between the fixed conical plate and the movable conical plate, and a hydraulic cylinder 23$a$, 23$b$ provided on the back surface of the movable conical plate for displacing the movable conical plate in an axial direction. When hydraulic pressures supplied to the hydraulic cylinders 23$a$, 23$b$ are adjusted, the widths of the V-grooves change to change contact radii of the V-belt 23 and the respective pulleys 21, 22, whereby a speed ratio vRatio of the variator 20 continuously changes.

The sub-transmission mechanism 30 is a transmission mechanism with two forward speeds and one reverse speed. The sub-transmission mechanism 30 includes a Ravigneaux-type planetary gear mechanism 31 in which carriers of two planetary gears are coupled, and a plurality of frictional engagement elements (low brake 32, high clutch 33, reverse brake 34) which are connected to a plurality of rotation elements constituting the Ravigneaux-type planetary gear mechanism 31 to change coupled states of these rotation elements. If the supply of hydraulic pressures to the respective frictional engagement elements 32 to 34 are adjusted to change engaged and released states of the respective frictional engagement elements 32 to 34, a gear position of the sub-transmission mechanism 30 is changed. For example, the sub-transmission mechanism 30 is set to a first gear position if the low brake 32 is engaged and the high clutch 33 and the reverse brake 34 are released. The transmission mechanism 30 is set to a second gear position with a speed ratio smaller than in the first gear position if the high clutch 33 is engaged and the low brake 32 and the reverse brake 34 are released. The sub-transmission mechanism 30 is set to a reverse gear position if the reverse brake 34 is engaged and the low brake 32 and the high clutch 33 are released. In the following description, a case where the sub-transmission mechanism 30 is in the first gear position is expressed by that "the transmission 4 is in a low-speed mode" and a case where the sub-transmission mechanism 30 is in the second gear position is expressed by that "the transmission 4 is in a high-speed mode".

Figure 2:
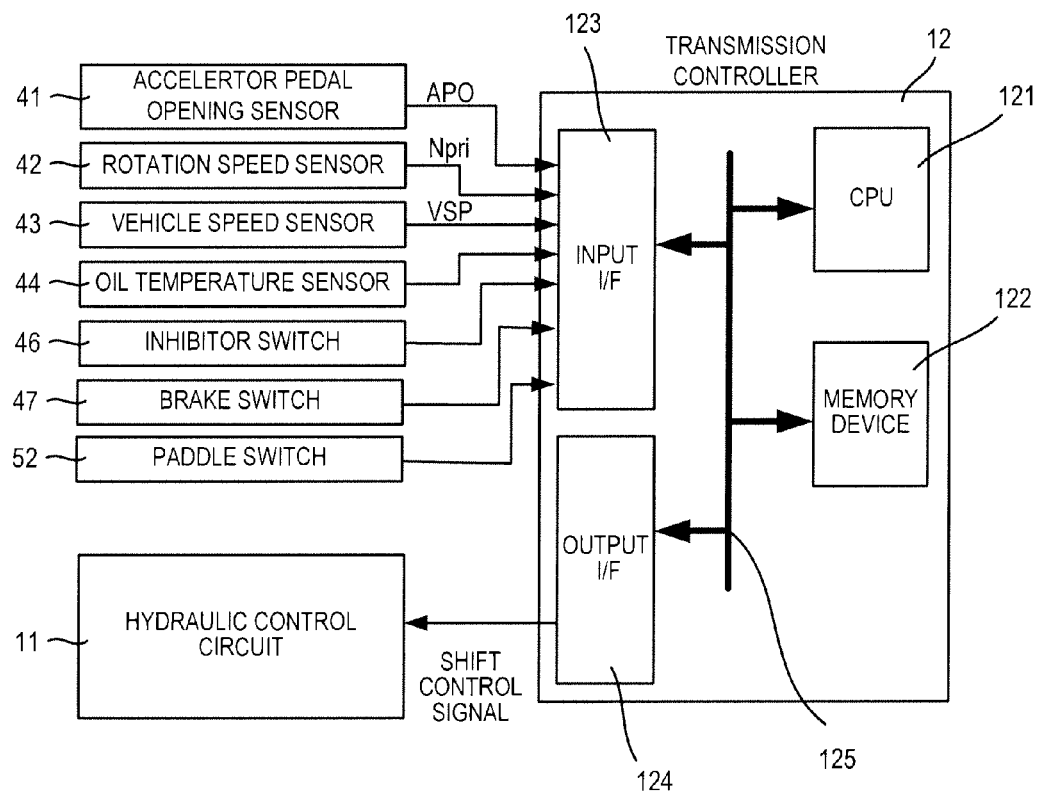
FIG. 2 is a diagram showing an exemplary construction of a transmission controller according to the embodiment of the present invention.

The transmission controller 12 includes a CPU 121, a memory device 122 composed of a RAM/ROM, an input interface 123, an output interface 124 and a bus 125 which connects these components to each other as shown in FIG. 2.

To the input interface 123 are input an output signal of an accelerator pedal opening sensor 41 for detecting the opening of an accelerator pedal (hereinafter, referred to as an "accelerator pedal opening APO"), an output signal of a rotation speed sensor 42 for detecting an input rotation speed of the transmission 4 (=rotation speed of the primary pulley 21, hereinafter, referred to as a "primary rotation speed Npri"), an output signal of a vehicle speed sensor 43 for detecting a driving speed of the vehicle (hereinafter, referred to as a "vehicle speed VSP"), an output signal of an oil temperature sensor 44 for detecting the oil temperature of the transmission 4, an output signal of an inhibitor switch 46 for detecting the position of a select lever 45, an output signal of a brake switch 47 for detecting depression of a brake pedal, and like output signals. An output signal of a paddle switch 50 for detecting an operated state of a paddle 51 provided on a steering wheel 52 is also input.

A shift control program of the transmission 4 and a shift map (FIG. 3) used in this shift control program are stored in the memory device 122. The CPU 121 reads the shift control program stored in the memory device 122 and implements it, performs various computations on various signals input via the input interface 123 to generate a shift control signal, and outputs the generated shift control signal to the hydraulic control circuit 11 via the output interface 124. Various values used in the computations by the CPU 121 and computation results are appropriately stored in the memory device 122.

The hydraulic control circuit 11 includes a plurality of flow passages and a plurality of hydraulic control valves. In accordance with the shift control signal from the transmission controller 12, the hydraulic control circuit 11 controls the plurality of hydraulic control valves to switch supply paths of the hydraulic pressure, prepares a necessary hydraulic pressure from a hydraulic pressure produced in the oil pump 10, and supplies this hydraulic pressure to the respective components of the transmission 4. In this way, the speed ratio vRatio of the variator 20 and the gear position of the sub-transmission mechanism 30 are changed to shift the transmission 4.

Figure 3:
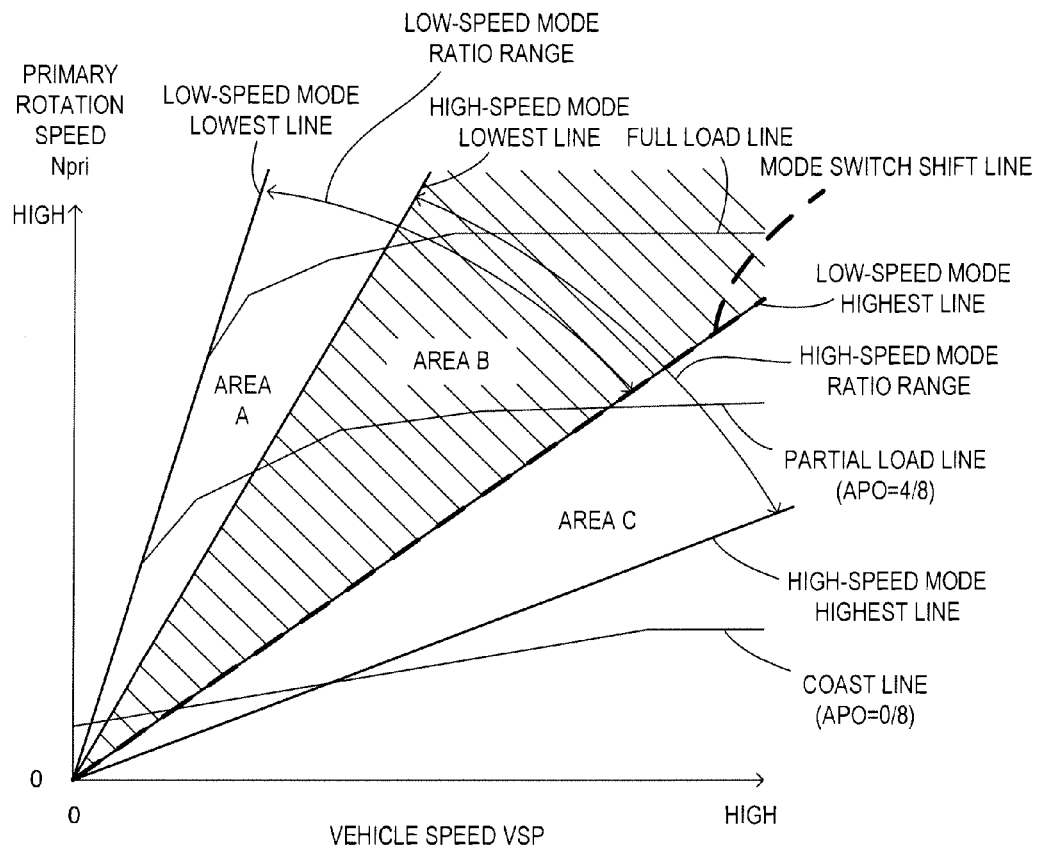
FIG. 3 is a graph showing an example of a shift map according to the embodiment of the present invention.

FIG. 3 shows an example of the shift map stored in the memory device 122 of the transmission controller 12.

On this shift map, an operating point of the transmission 4 is determined by the vehicle speed VSP and the primary rotation speed Npri. The inclination of a line connecting the operating point of the transmission 4 and a zero point at the lower left corner of the shift map indicates the speed ratio of the transmission 4 (overall speed ratio obtained by multiplying the speed ratio vRatio of the variator 20 by a speed ratio subRatio of the sub-transmission mechanism 30, hereinafter, referred to as a "through speed ratio Ratio"). In this shift map, a shift line is set for each accelerator pedal opening APO similar to a shift map of a conventional V-belt continuously variable transmission, and the transmission 4 is shifted in accordance with the shift line selected based on the accelerator pedal opening APO. For simplicity, only a whole load line (shift line when the accelerator pedal opening APO=8/8), a partial load line (shift line when the accelerator pedal opening APO=4/8) and a coast line (shift line when the accelerator pedal opening APO=0/8) are shown in FIG. 3.

When being in the low-speed mode, the transmission 4 can be shifted between a low-speed mode lowest line obtained by maximizing the speed ratio vRatio of the variator 20 and a low-speed mode highest line obtained by minimizing the speed ratio vRatio of the variator 20. At this time, the operating point of the transmission 4 moves in areas A and B. On the other hand, when being in the high-speed mode, the transmission 4 can be shifted between a high-speed mode lowest line obtained by maximizing the speed ratio vRatio of the variator 20 and a high-speed mode highest line obtained by minimizing the speed ratio vRatio of the variator 20. At this time, the operating point of the transmission 4 moves in areas B and C.

The speed ratio of each gear position of the sub-transmission mechanism 30 is so set that the speed ratio corresponding to the low-speed mode highest line (low-speed mode highest speed ratio, second speed ratio) is smaller than the speed ratio corresponding to the high-speed mode lowest line (high-speed mode lowest speed ratio, first speed ratio). By this, a low-speed ratio range which is a range of the through speed ratio Ratio of the transmission 4 that can be set in the low-speed mode and a high-speed mode ratio range which is a range of the through speed ratio Ratio of the transmission 4 that can be set in the high-speed mode partly overlap, and the transmission 4 can be selectively set in either one of the low-speed mode or the high-speed mode if the operating point of the transmission 4 is in the area B defined between the high-speed mode lowest line and the low-speed mode highest line.

The transmission controller 12 sets the through speed ratio Ratio corresponding to the vehicle speed VSP and the accelerator pedal opening APO (driving condition of the vehicle) as a final through speed ratio DRatio by referring to this shift map. This final through speed ratio DRatio is a target value which should be finally reached by the through speed ratio Ratio in this driving condition. Then, the transmission controller 12 sets a target through speed ratio tRatio which is a transient target value for causing the through speed ratio Ratio to follow the final through speed ratio DRatio with desired response characteristics, and controls the variator 20 and the sub-transmission mechanism 30 so that the through speed ratio Ratio coincides with the target through speed ratio tRatio.

On this shift map, a mode switch shift line (1-2 shift line of the sub-transmission mechanism 30) at which the sub-transmission mechanism 30 is shifted is so set as to overlap the low-speed mode highest line. A through speed ratio corresponding to the mode switch shift line (hereinafter, referred to as a "mode switch speed ratio mRatio") is equal to the low-speed mode highest speed ratio.

When the operating point of the transmission 4 crosses the mode switch shift line, i.e. the through speed ratio Ratio of the transmission 4 changes over the mode switch speed ratio mRatio, the transmission controller 12 executes a mode switch shift control. In the mode switch shift control, the transmission controller 12 shifts the sub-transmission mechanism 30 and performs a synchronization shift to change the speed ratio vRatio of the variator 20 in a direction opposite to a changing direction of the speed ratio subRatio of the sub-transmission mechanism 30.

In the synchronization shift, when the through speed ratio Ratio of the transmission 4 changes from a value larger than the mode switch speed ratio mRatio to a value smaller than that, the transmission controller 12 changes the gear position of the sub-transmission mechanism 30 from the first gear position to the second gear position (hereinafter, referred to as a "1-2 shift") and increases the speed ratio vRatio of the variator 20. Conversely, when the through speed ratio Ratio of the transmission 4 changes from a value smaller than the mode switch speed ratio mRatio to a value larger than that, the transmission controller 12 changes the gear position of the sub-transmission mechanism 30 from the second gear position to the first gear position (hereinafter, referred to as a "2-1 shift") and decreases the speed ratio vRatio of the variator 20.

The synchronization shift is performed at the time of a mode switch shift to suppress a sense of incongruity given to a driver as the input rotation changes due to a difference in the through speed ratio Ratio of the transmission 4. The mode switch shift is performed when the speed ratio vRatio of the variator 20 is the highest speed ratio because a torque input to the sub-transmission mechanism 30 is the smallest in this state under a torque input to the variator 20 at that time and a shift shock of the sub-transmission mechanism 30 can be alleviated if the sub-transmission mechanism 30 is shifted in this state.

According to the shift map, the speed ratio vRatio of the variator 20 is lowest and the sub-transmission mechanism 30 is in the first gear position when the vehicle stops.

Next, a manual mode shift is described.

The transmission 4 of this embodiment has a mode (manual mode) in which the transmission 4 can be fixed at a predetermined speed ratio by a driver's intention.

The transmission controller 12 includes a shift map (manual mode shift map) with a plurality of shift lines, at which the speed ratio is fixed at a predetermined speed ratio, beforehand. When a shift instruction is given from the driver, a control is executed to fix the speed ratio at the instructed shift line.

Figure 4:
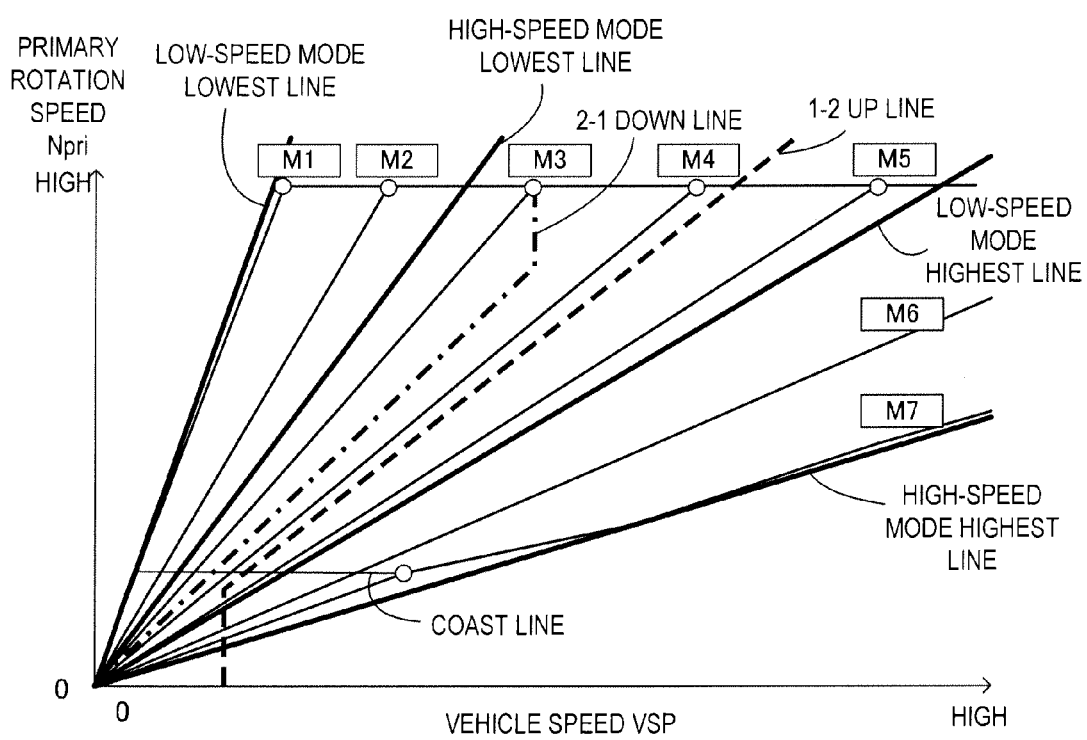
FIG. 4 is a graph showing an example of a manual mode shift map according to the embodiment of the present invention.

FIG. 4 is a diagram showing an example of the manual mode shift map of this embodiment.

An M1 shift line set to extend substantially along the low-speed mode lowest line, an M7 shift line set to extend substantially along the high-speed mode highest line, and M2 to M6 shift lines set between the M1 and M7 shift lines, i.e. shift lines representing a total of seven gear positions are set in the manual mode shift map shown in FIG. 4.

A driver instructs a transition to the manual mode by operating the select lever 45, the paddle 51 provided on the steering wheel 52 or the like when wishing a transition to the manual mode. In response to this, the transmission controller 12 changes the shift map from the normal shift map of FIG. 3 to the manual mode shift map of FIG. 4. In this way, the transition is made to the manual mode.

When the transition is made to the manual mode, the transmission controller 12 first changes a shift point to the manual mode shift line closest to the present shift point in the manual mode shift map. Alternatively, when the transition is made to the manual mode, the present shift point may be fixed and a shift may be performed along the shift line when a shift instruction is given from the driver.

If the driver instructs a desired gear position (M1 to M7) by operating the select lever 45 or the paddle 51 after the transition to the manual mode, the transmission controller 12 moves the shift point to a predetermined shift line of the manual mode shift map shown in FIG. 4 so that the speed ratio is fixed at the instructed gear position. In this way, a manual mode shift is realized.

Out of the manual mode shift lines, the M1 and M2 shift lines can be shifted only when the sub-transmission mechanism 30 is in the low-speed mode and the M6 and M7 shift lines can be shifted only when the sub-transmission mechanism 30 is in the high-speed mode. Further, the M3, M4 and M5 shift lines can be shifted regardless of whether the sub-transmission mechanism 30 is in a low mode or a high mode.

Accordingly, in the manual shift mode, the M1 and M2 gear positions can be shifted only when the sub-transmission mechanism is in the low mode. Further, the M6 and M7 gear positions can be shifted only when the sub-transmission mechanism is in the high mode. Thus, the transmission controller 12 shifts the speed ratio of the variator 20 for a shift between the M1 and M2 gear positions and for a shift between the M6 and M7 gear positions.

Further, the M3, M4 and M5 gear positions can be realized regardless of whether the sub-transmission mechanism 30 is in the low mode or the high mode. However, in the case of a shift from the M3 gear position to the M2 gear position when the sub-transmission mechanism 30 is in the high mode or in the case of a shift from the M5 gear position to the M6 gear position when the sub-transmission mechanism 30 is in the low mode, the transmission controller 12 needs to control the shift of the sub-transmission mechanism 30.

As shown in FIG. 4, a 1-2 UP line for shifting up the sub-transmission mechanism 30 from the low mode to the high mode is set in an area (area B) where the sub-transmission mechanism 30 can be shifted to either one of the low mode or the high mode. A 2-1 DOWN line for shifting down the sub-transmission mechanism 30 from the high mode to the low mode is similarly set.

The transmission controller 12 acquires the primary rotation speed Npri and the vehicle speed VSP in the normal shift map which is not the manual mode shift map, and shifts up the sub-transmission mechanism 30 from the low mode to the high mode when the shift point moves to a side where the vehicle speed is higher and the rotation speed is lower than the 1-2 UP line. Further, the transmission controller 12 shifts down the sub-transmission mechanism 30 from the high mode to the low mode when the shift point moves to a side where the vehicle speed is lower and the rotation speed is higher than the 2-1 DOWN line.

As described above, in the manual mode, some shifts between the respective shift lines can be achieved only by the shift of the variator 20 and the other shifts require the shift of the sub-transmission mechanism 30. The shift of the sub-transmission mechanism 30 has slower shift responsiveness than the shift of only the variator 20.

Figure 5:
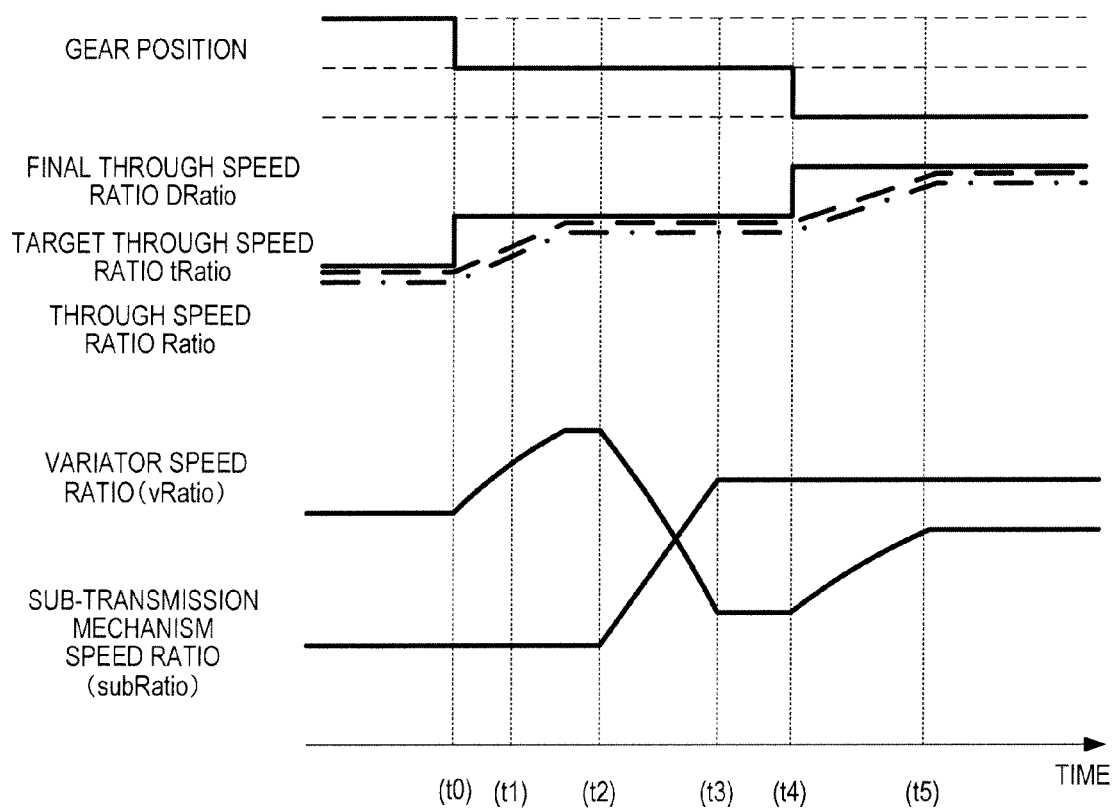
FIG. 5 is a time chart of a shift control in a manual mode according to the embodiment of the present invention.

FIG. 5 is a time chart of a shift control in the manual mode according to the embodiment.

When a shift instruction is given from the driver in a state where the manual mode is selected (timing t0), the transmission controller 12 sets a final through speed ratio DRatio based on a gear position (M1 to M7 gear position) instructed from the driver. Then, the transmission controller 12 sets a target through speed ratio tRatio which causes the speed ratio to follow the set final through speed ratio DRatio in a specified response. The transmission controller 12 first shifts the variator 20 so that the through speed ratio Ratio (dashed-dotted line) coincides with the set target through speed ratio tRatio (chain line).

At this time, the sub-transmission mechanism 30 is shifted prior to a possible shift instruction.

More specifically, if one further gear position of the gear position attained for the present gear position by down-shifting instructed by the driver is invariably accompanied by the shift of the sub-transmission mechanism 30, in a state where the sub-transmission mechanism 30 is in the low mode, the sub-transmission mechanism 30 is shifted up from the low mode to the high mode after the shift of the variator 20 is completed.

For example, if a down-shifting instruction to the M3 gear position is given in the state where the present gear position is the M4 gear position and the sub-transmission mechanism 30 is in the high mode, one further gear position, i.e. M2 gear position requires the sub-transmission mechanism 30 to be in the low mode. Accordingly, the sub-transmission mechanism 30 is shifted down from the high mode to the low mode when down-shifting from the M4 gear position to the M3 gear position is performed.

Simultaneously with the shift of the sub-transmission mechanism 30, a synchronization shift for controlling the through speed ratio Ratio so as not to vary is performed by changing the speed ratio of the variator 20 in a direction opposite to a changing direction of the speed ratio of the sub-transmission mechanism 30 (timings t2 to t3).

If a down-shifting instruction is further given from the driver after such a shift control, the transmission controller 12 can cause the through speed ratio Ratio to follow the target through speed ratio tRatio only by the shift of the variator 20 since the sub-transmission mechanism 30 is already shifted to the low mode.

The shift in the manual mode is performed by such a control.

Since a shift instruction from the driver is given at an arbitrary timing in the manual mode, the following problem occurs.

Figure 6:
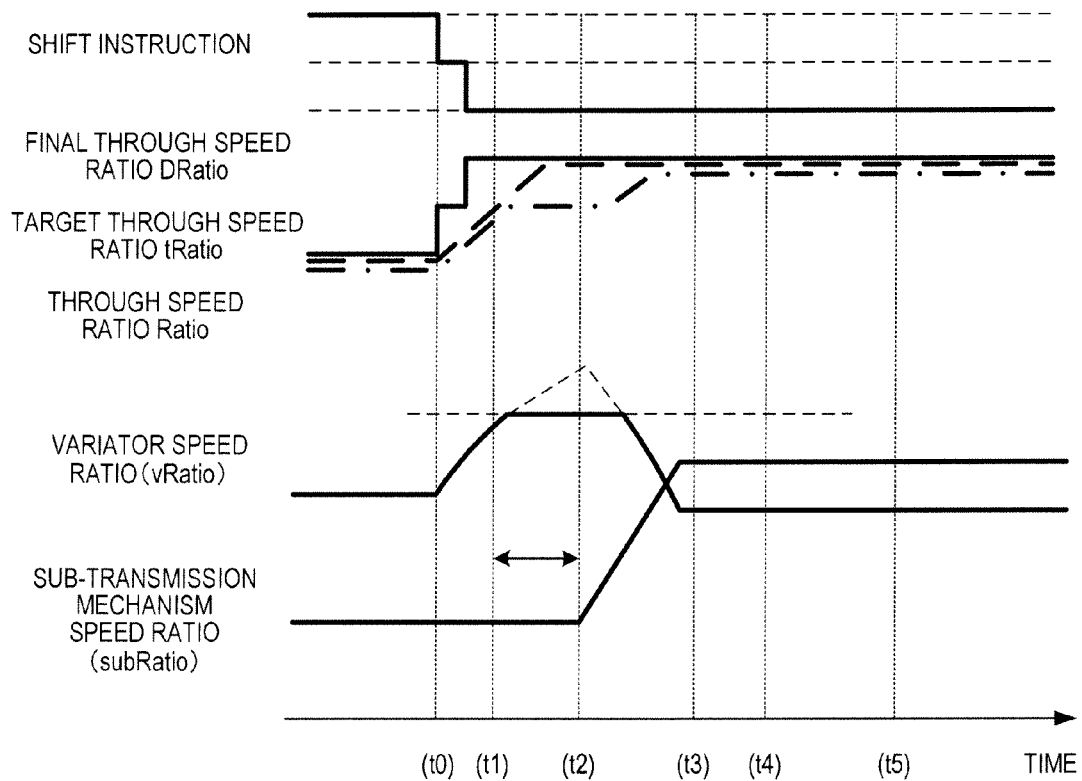
FIG. 6 is a reference chart in the embodiment of the present invention and a time chart of a skip shift.

FIG. 6 is a reference chart in the embodiment and a time chart of a skip shift, in which a shift instruction from the driver is given twice in a row.

Let us assume a situation in which one further gear position of the gear position attained for the present gear position by down-shifting instructed by the driver is invariably accompanied by the shift of the sub-transmission mechanism 30, in the state where the sub-transmission mechanism 30 is in the High mode as described above. In this case, it is assumed that the driver gives a down-shifting instruction twice in a row, e.g. gives a shift instruction from the M4 gear position to the M2 gear position. To successively give the next shift instruction after the first shift instruction from the driver until a shift corresponding to the first instruction is completed is referred to as a "skip shift" hereinafter.

At this time, the transmission controller 12 determines the target through speed ratio tRatio based on the first shift instruction and starts shifting the variator 20. However, if a further shift instruction is given from the driver and the through speed ratio Ratio cannot be achieved by only the shift of the variator 20 in this gear position, the variator 20 cannot be shifted to a lower side (mechanical low) during the shift control of the transmission controller 12.

In a state where the variator 20 is unshiftable, the transmission controller 12 starts shifting the sub-transmission mechanism 30 to realize the through speed ratio Ratio.

At this time, since the shift responsiveness of the sub-transmission mechanism 30 is slow, the input rotation speed of the transmission 4 does not change until the shift of the sub-transmission mechanism 30 is started to start changing the through speed ratio Ratio after the variator 20 becomes unshiftable. This causes the engine rotation speed to remain substantially unchanged, thereby giving a sense of incongruity to the driver (interval indicated by arrows in FIG. 6).

In the present invention, a control as described below is executed to prevent a sense of incongruity from being given to the driver due to a delay in shift responsiveness when a skip shift instructed by the driver is accompanied by the shift of the sub-transmission mechanism 30.

Figure 7:
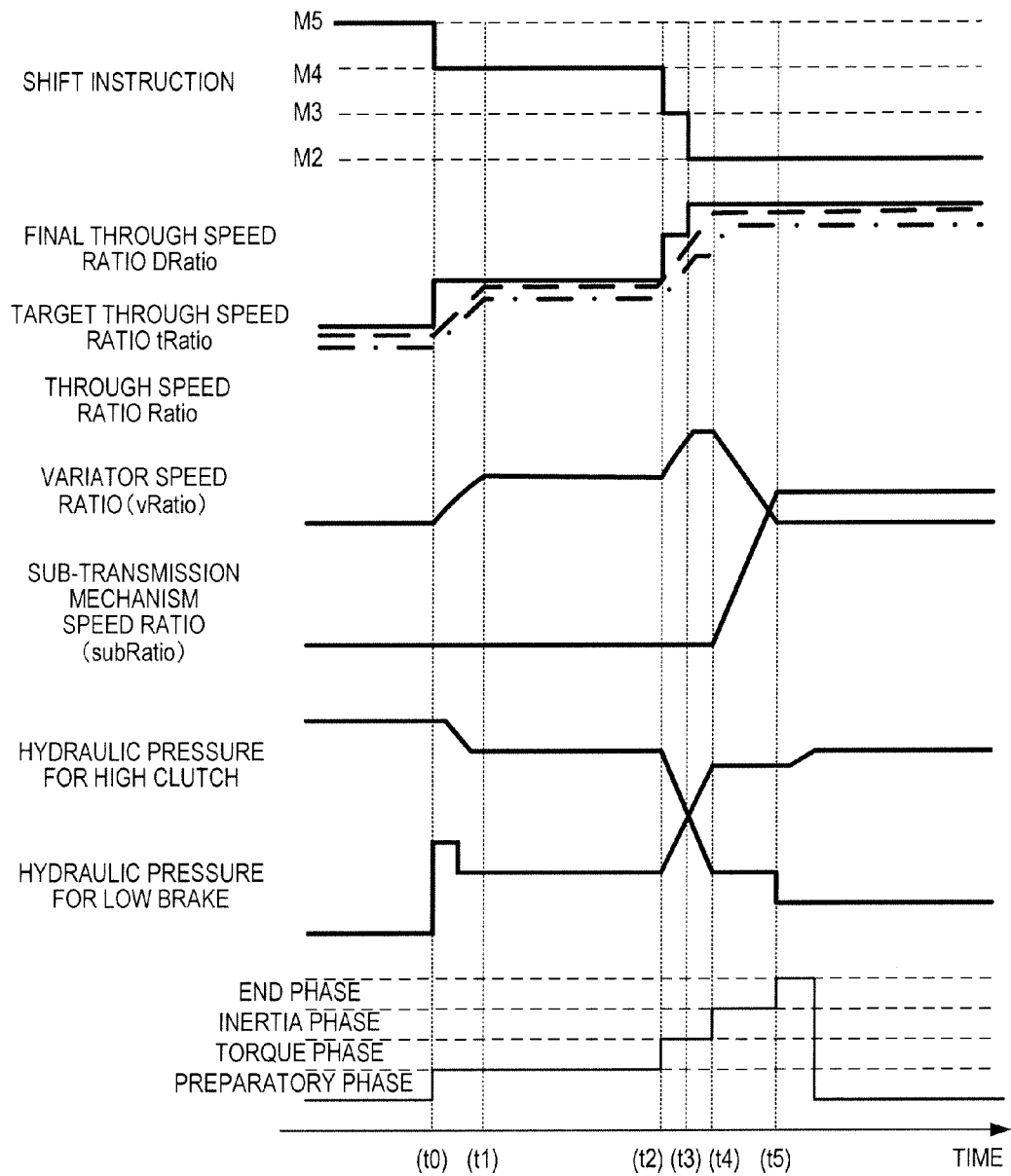
FIG. 7 is a time chart in the manual mode according to the embodiment of the present invention.

FIG. 7 is a time chart at the time of a shift control in the manual mode according to this embodiment in the case where down-shifting was instructed a plurality of times in a row after down-shifting was instructed by the driver.

When a shift instruction (e.g. from the M5 gear position to the M4 gear position) is given from the driver in the state where the manual mode is selected, the transmission controller 12 determines a target through speed ratio tRatio from a final through speed ratio DRatio corresponding to this gear position and shifts the variator 20 so that the through speed ratio Ratio follows the set target through speed ratio tRatio (timings t0 to t1).

At this time, in the case of predicting that the sub-transmission mechanism 30 needs to be shifted when the next shift is a skip shift (e.g. from the M4 gear position to the M2 gear position), the transmission controller 12 starts preparing for the shift of the sub-transmission mechanism 30 when the first shift instruction is given from the driver.

Specifically, if a gear position, which will require the shift of the sub-transmission mechanism 30 when skip down-shifting is instructed next time, is attained by down-shifting instructed from the driver at timing t0 of FIG. 7, a preparatory phase is performed in advance in reparation for a possible shift of the sub-transmission mechanism 30.

In the preparatory phase, the transmission controller 12 performs pre-charging to suppress a hydraulic pressure response delay by temporarily increasing the hydraulic pressure for the low brake 32 as a clutch to be engaged and, then, sets the hydraulic pressure to a torque transmission starting hydraulic pressure and waits on standby. The transmission controller 12 also sets the hydraulic pressure for the high clutch 33 to be released at a predetermined hydraulic pressure and waits on standby.

By performing the preparatory phase in advance and performing pre-charging beforehand in this way, a time from the start to the end of the shift of the sub-transmission mechanism 30 is shortened (timings t4 to t5) even in a range where the variator 20 is unshiftable (timing t3) when a skip shift is instructed thereafter (timing t2).

More specifically, when the skip shift is instructed (timing t2), the transmission controller 12 starts shifting the sub-transmission mechanism 30. Since the preparatory phase of the sub-transmission mechanism 30 is already completed at this time, the transmission controller 12 causes the sub-transmission mechanism 30 to immediately transition to a torque phase to switch a torque between the frictional elements.

Then, at a time point where the range where the variator 20 is unshiftable is reached (timing t3), the transmission controller 12 transitions to an inertia phase to start charging the speed ratio of the sub-transmission mechanism 30. Thereafter, the transmission controller 12 controls the speed ratios of the variator 20 and the sub-transmission mechanism 30 to follow the target through speed ratio tRatio.

By such a control, even if a skip shift is instructed by the driver, it can be suppressed to a minimum level that the engine rotation speed remains substantially unchanged.

In the control of FIG. 7, the transition is made to the preparatory phase when the first shift instruction is given from the driver. Unless any further shift instruction is given from the driver, a hydraulic control by pre-charging continues for a long time. In this state, the friction element to be released is likely to slip when the primary rotation speed Npri transiently changes. Thus, it is preferable to end pre-charging and return to normal engagement hydraulic pressure and release hydraulic pressure upon the elapse of a predetermined time after the preparatory phase is performed in advance.

Figure 8:
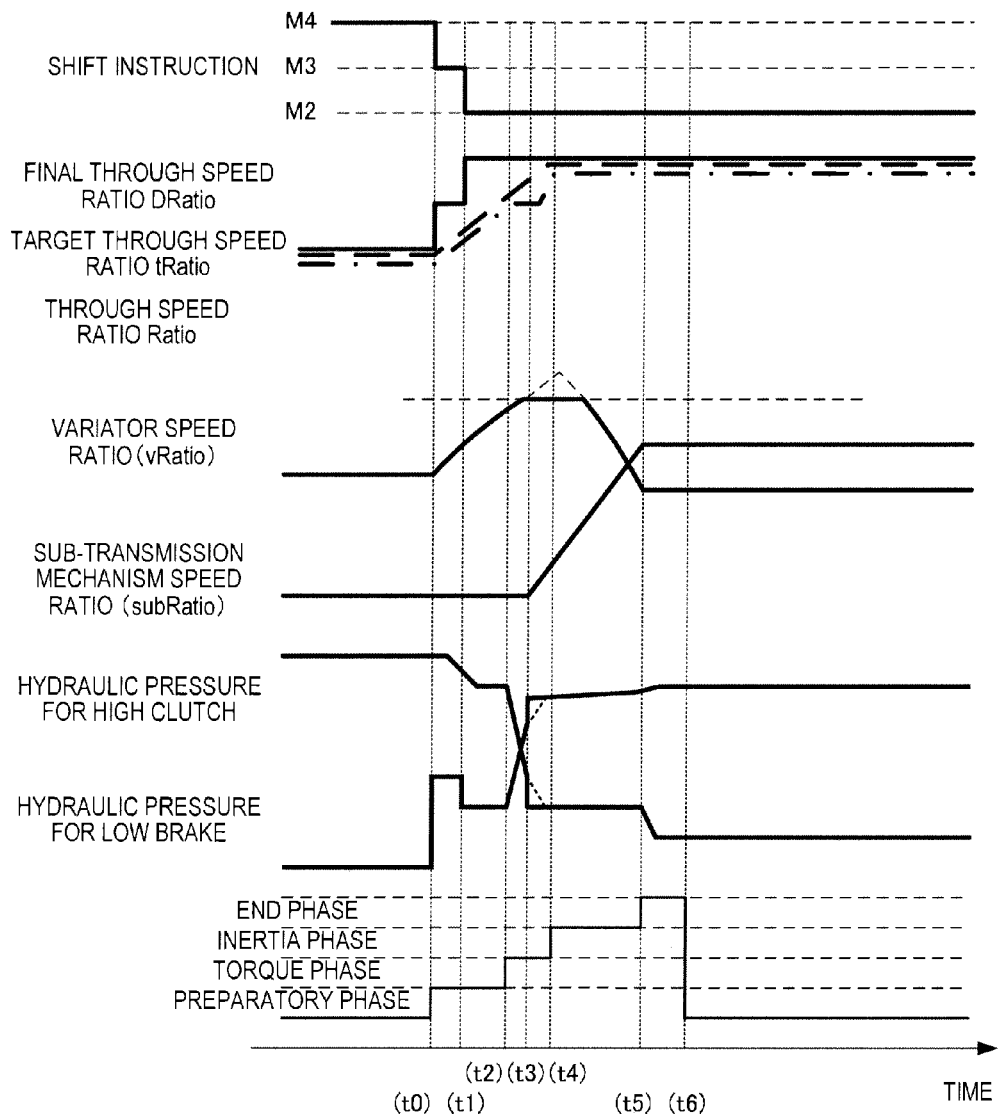
FIG. 8 is a time chart in the manual mode according to the embodiment of the present invention.

FIG. 8 is a time chart at the time of a shift control in the manual mode according to this embodiment in the case where down-shifting was instructed a plurality of times by the driver.

As described with reference to FIG. 7, the shift responsiveness of the sub-transmission mechanism 30 can be improved by performing pre-charging of the sub-transmission mechanism 30 in advance in preparation for a skip shift.

However, a skip shift may be instructed from the driver in a state where pre-charging of the sub-transmission mechanism 30 is already finished such as upon the elapse of a predetermined time after the pre-charging is performed in advance. In such a case, the transmission controller 12 performs the following process to improve the shift responsiveness of the sub-transmission mechanism 30.

When a shift instruction is given from the driver in the state where the manual mode is selected, the transmission controller 12 determines a target through speed ratio tRatio from a final through speed ratio DRatio corresponding to this gear position and shifts the variator 20 so that the through speed ratio Ratio follows the target through speed ratio tRatio (timing t0). At this time, the preparatory phase of the sub-transmission mechanism 30 is started in preparation for the shift of the sub-transmission mechanism 30.

The transmission controller 12 transitions to the preparatory phase to prepare for the shift of the sub-transmission mechanism 30 at the same time as the shift of the variator 20 is started. In the preparatory phase, the transmission controller 12 performs pre-charging to suppress a hydraulic pressure response delay by temporarily increasing the hydraulic pressure for the low brake 32 as a clutch to be engaged and, then, sets the hydraulic pressure to a torque transmission starting hydraulic pressure and waits on standby. The transmission controller 12 also sets the hydraulic pressure for the high clutch 33 to be released at a predetermined hydraulic pressure and waits on standby.

Here, if it is determined that a skip shift was instructed from the driver (timing t1), the transmission controller 12 executes a control to shorten the torque phase to improve the shift responsiveness of the sub-transmission mechanism 30, thereby preparing for a situation where the variator 20 becomes unshiftable.

The torque phase is shortened by reducing an instruction hydraulic pressure for the high clutch 33 to be released in a quicker response than in a normal shift and increasing an instruction hydraulic pressure for the low brake 32 to be engaged in a quicker response than in the normal shift. In this way, the torque phase is shortened and the start of the shift of the sub-transmission mechanism 30 is prepared earlier than in the normal shift (timings t2 to t4).

Here, if the variator 20 is further brought to a state where it is unshiftable, i.e. if a target value of the speed ratio vRatio of the variator used to follow the target through speed ratio tRatio cannot be realized in the present gear position (high mode) of the sub-transmission mechanism 30 (timing t3), the transmission controller 12 transitions to the inertia phase to change the speed ratio of the sub-transmission mechanism 30 at that time point.

Specifically, the transmission controller 12 further reduces the instruction hydraulic pressure for the high clutch 33 to be released and further increases the instruction hydraulic pressure for the low brake 32 to be engaged to an engagement starting hydraulic pressure. In this way, the speed ratio of the sub-transmission mechanism 30 starts changing. At this time, the through speed ratio Ratio first follows the target through speed ratio tRatio by a change in the speed ratio of the sub-transmission mechanism 30. If a range where the variator 20 is shiftable is reached thereafter, a synchronization shift is performed by the variator 20 and the sub-transmission mechanism 30 (timing t5).

By such a control, the shift responsiveness can be improved by suppressing the state where the variator 20 is unshiftable.

As in the control of FIG. 8, the transmission controller 12 shortens the torque phase of the sub-transmission mechanism and performs the inertia phase in advance, whereby the torque varies to cause a shift shock. However, since the driver instructed the skip shift at this time, the shift shock is tolerated to a high degree. Thus, the driver does not develop a large sense of incongruity.

In the control of FIG. 7, if a skip shift is instructed from the driver in a state where the preparatory phase is already being performed, the torque phase may be shortened as shown at timings t2 to t4 of FIG. 8 and the transition may be made to the inertia phase when the variator 20 becomes unshiftable.

Figure 9:
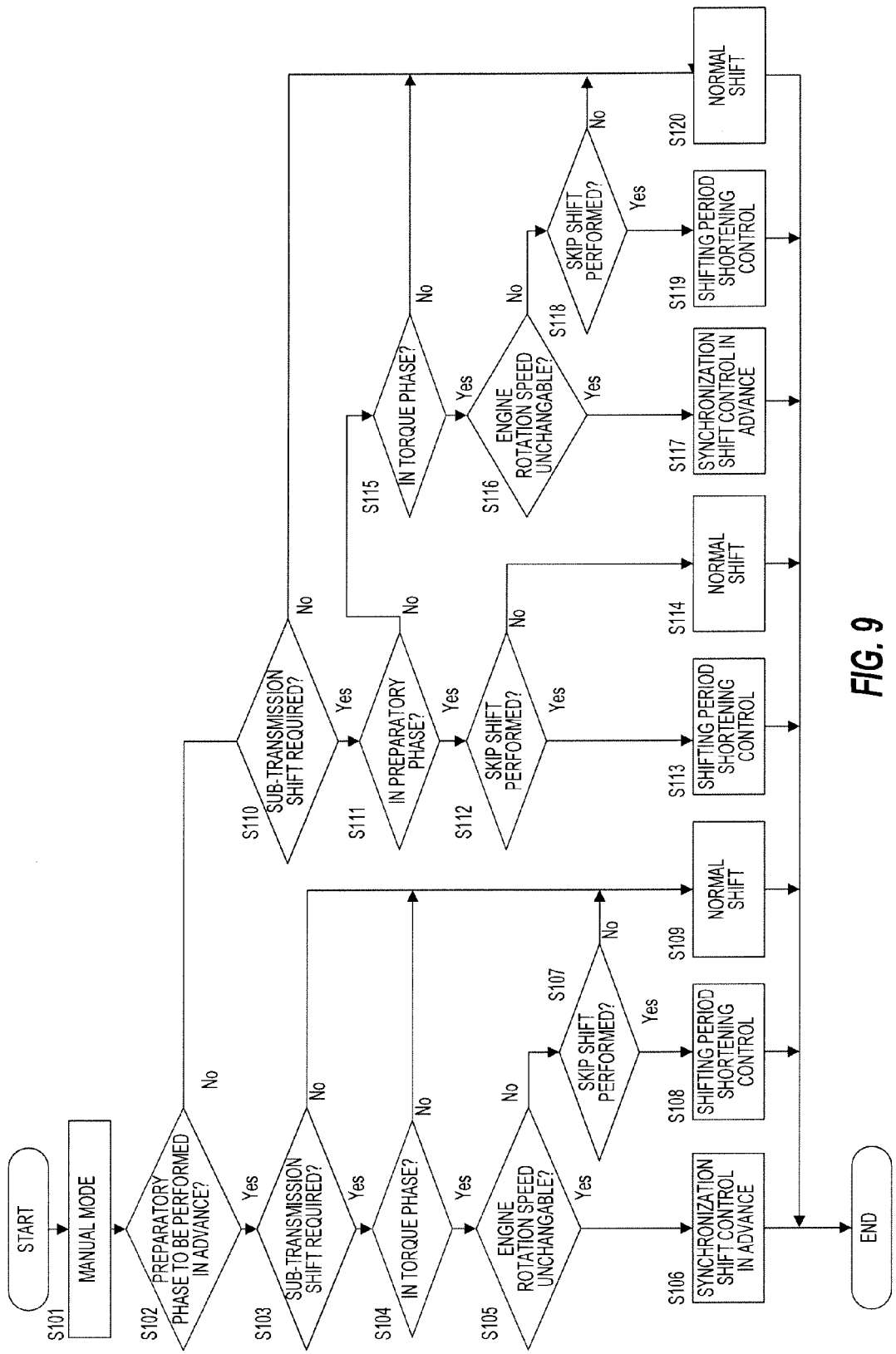
FIG. 9 is a flow chart of a control of a transmission controller according to the embodiment of the present invention.

FIG. 9 is a flow chart of a control of the transmission controller 12 according to this embodiment. A process of this flow chart is performed at every interval of a specified time (e.g. every 10 ms) in the transmission controller 12.

The transmission controller 12 starts the process of this flow chart (S101) when the manual mode is selected and a shift instruction from a driver is determined.

The transmission controller determines whether or not transitions to the preparatory phase and pre-charging are to be performed in advance based on the instruction from the driver (S102). The transition to the preparatory phase in advance is made to perform the preparatory phase in preparation for a possible shift of the sub-transmission mechanism 30 when a gear position, which will require the shift of the sub-transmission mechanism 30 when skip down-shifting is instructed next time, is attained by down-shifting instructed from the driver as described above.

When it is determined that the preparatory phase is to be performed in advance, a processing is performed so that the sub-transmission mechanism 30 transitions to the preparatory phase and the process proceeds to Step S103. When it is determined that the preparatory phase is not to be performed in advance, the process proceeds to Step S110.

In Step S103, the transmission controller 12 determines whether or not the shift requires the shift of the sub-transmission mechanism 30. The process proceeds to Step S104 when it is determined that the shift of the sub-transmission mechanism 30 is necessary while proceeding to Step S109 when it is determined that the shift of the sub-transmission mechanism 30 is not necessary. Determination as to whether or not the shift requires the shift of the sub-transmission mechanism 30 is made based on whether or not the shift instructed by the driver is the shift accompanied by the shift of the sub-transmission mechanism 30 by reference to the shift map of FIG. 4.

In Step S104, the transmission controller 12 determines whether or not the sub-transmission mechanism 30 is already in the torque phase. The process proceeds to Step S105 when the sub-transmission mechanism 30 is already in the torque phase while proceeding to Step S109 when the sub-transmission mechanism 30 is determined not to be in the torque phase.

In Step S105, the transmission controller 12 determines whether or not the target value of the speed ratio vRatio of the variator 20 has reached a speed ratio corresponding to the mechanical low to reach the unshiftable range and the engine rotation speed remains substantially unchanged. When it is determined that the engine rotation speed remains substantially unchanged, the process proceeds to Step S106 and the transmission controller 12 executes a control to perform a synchronization shift in advance for causing the sub-transmission mechanism 30 to immediately transition to the inertia phase in order to start changing the speed ratio of the sub-transmission mechanism 30.

When it is determined that the engine rotation speed does not remain substantially unchanged, the process proceeds to Step S107 and the transmission controller 12 determines whether or not the skip shift has been performed. When it is determined that the skip shift has been performed, the process proceeds to Step S108 and the transmission controller 12 executes a control to shorten a torque phase period in order to shorten a shifting period of the sub-transmission mechanism 30. When it is determined that the skip shift has not been performed, the process proceeds to Step S109 to execute a normal shift control.

After the processings of Steps S106, S108 and S109, the process by this flow chart is temporarily ended.

When it is determined in Step S102 that the preparatory phase is not to be performed in advance (or the preparatory phase is already performed), the process proceeds to Step S110 and the transmission controller 12 determines whether or not the shift requires the shift of the sub-transmission mechanism 30. The process proceeds to Step S111 when it is determined that the shift of the sub-transmission mechanism 30 is necessary while proceeding to Step S120 when it is determined that the shift of the sub-transmission mechanism 30 is not necessary.

In Step S111, the transmission controller 12 determines whether or not the sub-transmission mechanism 30 is already in the preparatory phase. The process proceeds to Step S112 when the sub-transmission mechanism 20 is already in the preparatory phase while proceeding to Step S115 when the sub-transmission mechanism 30 is determined not to be in the preparatory phase.

In Step S112, the transmission controller determines whether or not the skip shift has been performed. When it is determined that the skip shift has been performed, the process proceeds to Step S113 and the transmission controller 12 executes a control to shorten the torque phase period in order to shorten the shifting period of the sub-transmission mechanism 30. When it is determined that the skip shift has not been performed, the process proceeds to Step S114 to execute the normal shift control.

After the processings of Steps S113 and S114, the process by this flow chart is temporarily ended.

When it is determined in Step S111 that the preparatory phase is not being performed, the process proceeds to Step S115 and the transmission controller 12 determines whether or not the sub-transmission mechanism 30 is already in the torque phase. The process proceeds to Step S116 when the sub-transmission mechanism 30 is already in the torque phase while proceeding to Step S120 when the sub-transmission mechanism 30 is determined not to be in the torque phase.

In Step S116, the transmission controller 12 determines whether or not the range where the variator 20 is unshiftable has been reached and the engine rotation speed remains substantially unchanged. When it is determined that the engine rotation speed remains substantially unchanged, the process proceeds to Step S117 and the transmission controller 12 executes a control to perform a synchronization shift in advance for causing the sub-transmission mechanism 30 to immediately transition to the inertia phase in order to start changing the speed ratio of the sub-transmission mechanism 30.

When it is determined that the engine rotation speed does not remain substantially unchanged, the process proceeds to Step S118 and the transmission controller 12 determines whether or not the skip shift has been performed. When it is determined that the skip shift has been performed, the process proceeds to Step S119 and the transmission controller 12 executes a control to shorten the torque phase period in order to shorten the shifting period of the sub-transmission mechanism 30. When it is determined that the skip shift has not been performed, the process proceeds to Step S120 to execute the normal shift control.

After the processings of Steps S117, S119 and S120, the process by this flow chart is temporarily ended.

By the above process, the skip shift control in the manual mode is performed by the transmission controller 12.

As described above, according to the embodiment of the present invention, it can be prevented to give a sense of incongruity to a driver due to a difference in shift responsiveness in a so-called manual mode shift, in which a plurality of gear positions set beforehand are set in response to a shift instruction from a driver, in the continuously variable transmission that includes the continuously variable transmission mechanism (variator) 20 and the sub-transmission mechanism 30 having a plurality of gear positions and can enlarge the shift area.

More specifically, in a situation where a skip shift to be possibly instructed thereafter is predicted to be accompanied by the shift of the sub-transmission mechanism 30 when a shift instruction is given from the driver, the preparatory phase of the sub-transmission mechanism 30 is performed in advance to pre-charge the friction element to be engaged, thereby keeping the same on standby at a torque transmission starting hydraulic pressure, and the friction element to be released is kept on standby at a release starting hydraulic pressure.

By this, even if a skip shift instructed from the driver results in the shift of the sub-transmission mechanism 30, the preparatory phase of the sub-transmission mechanism 30 is already completed. Thus, the shift responsiveness of the sub-transmission mechanism 30 is quickened and a sense of incongruity is prevented from being given to the driver due to the engine rotation speed remaining substantially unchanged in a state where the variator 20 enters the mechanical low state and becomes unshiftable.

Further, it can be prevented that a sense of incongruity is developed by the driver due to the engine rotation speed remaining substantially unchanged by shortening the torque phase period of the sub-transmission mechanism 30 when a skip shift is instructed from the driver and by causing the sub-transmission mechanism 30 to immediately transition to the inertia phase to change the speed ratio when the variator 20 enters the mechanical low state and becomes unshiftable.

The embodiment of the present invention has been described above. The above embodiment is merely illustration of one application example of the present invention and not of the nature to limit the technical scope of the present invention to the specific construction of the above embodiment.

For example, the V-belt continuously variable transmission mechanism is provided as the variator 20 in the above embodiment, but the variator 20 may be a continuously variable transmission mechanism in which a chain is wrapped around the pulleys 21 and 22 instead of the V-belt 23. Alternatively, the variator 20 may be a toroidal continuously variable transmission mechanism in which inclinable power rollers are arranged between an input disk and an output disk.

Although the sub-transmission mechanism 30 is a transmission mechanism with two forward gear positions, i.e. the first and second gear positions in the above embodiment, it may be a transmission mechanism with three or more forward gear positions.

Although the sub-transmission mechanism 30 is constructed using the Ravigneaux-type planetary gear mechanism, it is not limited to such a construction. For example, the sub-transmission mechanism 30 may be constructed by combining a normal planetary gear mechanism and frictional engagement elements or may be constructed by a plurality of power transmission paths including a plurality of gear trains with different gear ratios and frictional engagement elements for switching these power transmission paths.

Although the hydraulic cylinders 23a, 23b are provided as actuators for displacing the movable conical plates of the pulleys 21, 22 in the axial directions, the actuators are not limited to hydraulically driven ones and may be electrically driven.

This application claims priority based on Japanese Patent Application No. 2010-200986, filed with the Japan Patent Office on Sep. 8, 2010, the entire content of which is incorporated into this specification by reference.

What is claimed is:

1. A continuously variable transmission installed in a vehicle to shift a rotation speed of an engine, comprising:
a variator which changes a speed ratio continuously;
a stepped sub-transmission mechanism provided in series with the variator and configured to switch a speed ratio depending on engagement and release of a plurality of friction elements; and
a shift control unit configured to set a final through speed ratio as a target speed ratio based on a driving condition of the vehicle and to cause a through speed ratio, which is an overall speed ratio of the variator and the sub-transmission mechanism, to follow the final through speed ratio in a specified response by changing at least one of the speed ratio of the variator or a gear position of the sub-transmission mechanism,
wherein the shift control unit has a manual mode in which a plurality of gear positions are set beforehand and a speed ratio corresponding to any one of the plurality of gear positions is set as the final through speed ratio based on a shift instruction by a driver, the shift control unit being further configured to:
execute a control to cause the through speed ratio to follow the final through speed ratio by changing only the speed ratio of the variator if the shift instruction is given from the driver multiple times in a row when the manual mode is selected; and
advance a start of a change in the speed ratio of the sub-transmission mechanism or accelerate a progression of the change of the speed ratio of the sub-transmission mechanism as compared with the a case where the manual mode is not selected when the speed ratio of the variator is maximized or minimized and the through speed ratio cannot follow the final through speed ratio.

2. The continuously variable transmission according to claim 1, wherein the shift control unit is configured to shorten a preparation period for a hydraulic control for engaging and releasing the plurality of friction elements or shorten an execution period of the hydraulic control for engaging and releasing the plurality of friction elements when the variator is in a range where the final through speed ratio cannot be realized.

3. The continuously variable transmission according to claim 2, wherein the shift control unit is configured to execute a control to set a shift preparing state wherein:
   a control hydraulic pressure for a friction element being presently released is kept on standby at an engagement starting hydraulic pressure after being increased, and
   a control hydraulic pressure for a friction element being presently engaged is kept on standby at a release starting hydraulic pressure at a time of the shift instruction by the driver if a gear position. which will require shifting of the sub-transmission mechanism when a shift is performed multiple times in a same direction from a present gear position, is attained by a shift instructed by the driver.

4. A shift control method for a continuously variable transmission including a variator which changes a speed ratio continuously, and a stepped sub-transmission mechanism provided in series with the variator and configured to switch a speed ratio depending on engagement and release of a plurality of friction elements, and is installed to shift and output an output rotation of a driving source in a vehicle having a transmission controller, the method comprising:
   setting, by the transmission controller, a final through speed ratio as a target speed ratio based on a driving condition of the vehicle;
   causing, by the transmission controller, a through speed ratio, which is an overall speed ratio of the variator and the sub-transmission mechanism, to follow the final through speed ratio in a specified response by changing at least one of the speed ratio of the variator or a gear position of the sub-transmission mechanism;
   causing, by the transmission controller, the through speed ratio to follow the final through speed ratio by changing only the speed ratio of the variator if a shift instruction is given by a driver multiple times in a row when a manual mode is set in which a plurality of gear positions are set beforehand and a speed ratio corresponding to any one of the plurality of gear positions is set as the final through speed ratio based on the shift instruction by the driver; and
   advancing, by the transmission controller, a start of a change in the speed ratio of the sub-transmission mechanism or accelerating, by the transmission controller, a progression of the change of the speed ratio of the sub-transmission mechanism as compared with a case where the manual mode is not selected when the speed ratio of the variator is maximized or minimized and the through speed ratio cannot follow the final through speed ratio.

5. The shift control method according to claim 4, further comprising:
   shortening, by the transmission controller, a preparation period for a hydraulic control for engaging and releasing the plurality of friction elements or shortening, by the transmission controller, an execution period of the hydraulic control for engaging and releasing the plurality of friction elements when the variator is in a range where the final through speed ratio cannot be realized.

6. The shift control method according to claim 5, further comprising executing, by the transmission controller, a control to set a shift preparing state, wherein:
   a control hydraulic pressure for a friction element being presently released is kept on standby at an engagement starting hydraulic pressure after being increased, and
   a control hydraulic pressure for the friction element being presently engaged is kept on standby at a release starting hydraulic pressure at a time of the shift instruction by the driver if a gear position, which will require shifting of the sub-transmission mechanism when a shift is performed multiple times in a same direction from a present gear position, is attained by a shift instructed by the driver.

7. A continuously variable transmission installed in a vehicle to shift a rotation speed of an engine, comprising:
   a variator which changes a speed ratio continuously;
   a stepped sub-transmission mechanism provided in series with the variator and configured to switch a speed ratio depending on engagement and release of a plurality of friction elements;
   means for setting a final through speed ratio as a target speed ratio based on a driving condition of the vehicle and causing a through speed ratio, which is an overall speed ratio of the variator and the sub-transmission mechanism, to follow the final through speed ratio in a specified response by changing at least one of the speed ratio of the variator or a gear position of the sub-transmission mechanism,
   means for causing the through speed ratio to follow the final through speed ratio by changing only the speed ratio of the variator if a shift instruction is given by a driver multiple times in a row when a manual mode in which gear positions are set beforehand and a speed ratio corresponding to any one of the plurality of gear positions is set as the final through speed ratio based on the shift instruction by the driver is selected; and
   means for advancing a start of a change in the speed ratio of the sub-transmission mechanism or accelerating a progression of the change of the speed ratio of the sub-transmission mechanism as compared with a case where the manual mode is not selected when the speed ratio of the variator is maximized or minimized and the through speed ratio cannot follow the final through speed ratio.

8. The continuously variable transmission according to claim 7, further comprising means for shortening a preparation period for a hydraulic control for engaging and releasing the plurality of friction elements or shortening an execution period of the hydraulic control for engaging and releasing the plurality of friction elements when the variator is in a range where the final through speed ratio cannot be realized.

9. The continuously variable transmission according to claim 8, further comprising means for executing a control to set a shift preparing state wherein:
   a control hydraulic pressure for a friction element being presently released is kept on standby at an engagement starting hydraulic pressure after being increased, and
   a control hydraulic pressure for a friction element being presently engaged is kept on standby at a release starting hydraulic pressure at a time of the shift instruction by the driver if a gear position, which will require shifting of the sub-transmission mechanism when a shift is performed multiple times in a same direction from a present gear position, is attained by a shift instructed by the driver.

* * * * *